US008918720B1

(12) United States Patent
Wu et al.

(10) Patent No.: US 8,918,720 B1
(45) Date of Patent: Dec. 23, 2014

(54) LIST OF MOST SELECTED WEB BASED APPLICATION DOCUMENTS

(75) Inventors: Ping Wu, Saratoga, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/350,533

(22) Filed: Jan. 13, 2012

(51) Int. Cl.
*G06F 17/30* (2006.01)

(52) U.S. Cl.
USPC ............ 715/745; 715/747; 715/760; 707/610

(58) Field of Classification Search
CPC ............... G06F 17/30867; G06F 17/30817; G06F 17/30873; G06F 17/30905; G06F 17/30899; G06F 17/30902
See application file for complete search history.

(56) References Cited

U.S. PATENT DOCUMENTS

| | | | | |
|---|---|---|---|---|
| 6,473,752 B1* | 10/2002 | Fleming, III | .................. | 707/708 |
| 7,664,821 B1* | 2/2010 | Ancin et al. | .................. | 709/206 |
| 2002/0120858 A1* | 8/2002 | Porter et al. | .................. | 713/200 |
| 2003/0018626 A1* | 1/2003 | Kay et al. | .......................... | 707/3 |
| 2004/0012802 A1* | 1/2004 | Allen et al. | .................. | 358/1.13 |
| 2005/0097441 A1* | 5/2005 | Herbach et al. | ............ | 715/501.1 |
| 2005/0177803 A1* | 8/2005 | Ruthfield et al. | ............. | 715/854 |
| 2005/0267917 A1* | 12/2005 | Arcuri et al. | .................. | 707/200 |
| 2007/0226204 A1* | 9/2007 | Feldman | ........................... | 707/5 |
| 2007/0283011 A1* | 12/2007 | Rakowski et al. | ............ | 709/225 |
| 2008/0033919 A1* | 2/2008 | Arrouye et al. | .................... | 707/3 |
| 2008/0052343 A1* | 2/2008 | Wood | ............................ | 709/202 |
| 2008/0222238 A1* | 9/2008 | Ivanov et al. | ................. | 709/202 |
| 2008/0229236 A1* | 9/2008 | Carrer et al. | ................... | 715/786 |
| 2009/0024609 A1* | 1/2009 | Barker et al. | ...................... | 707/5 |
| 2009/0037492 A1* | 2/2009 | Baitalmal et al. | ............. | 707/201 |
| 2009/0210806 A1* | 8/2009 | Dodson et al. | ................ | 715/760 |
| 2009/0249453 A1* | 10/2009 | Cluck et al. | ........................ | 726/5 |
| 2009/0327913 A1* | 12/2009 | Adar et al. | ..................... | 715/745 |
| 2010/0115254 A1* | 5/2010 | Deng et al. | ......................... | 713/1 |
| 2010/0287219 A1* | 11/2010 | Caso et al. | ...................... | 707/827 |
| 2011/0225249 A1* | 9/2011 | Forstall et al. | ................ | 709/206 |
| 2012/0203733 A1* | 8/2012 | Zhang | ........................... | 707/600 |
| 2012/0260192 A1* | 10/2012 | Detweiler | ...................... | 715/745 |

OTHER PUBLICATIONS

"Collaborative Technologies and Applications for Interactive Information Design," by Rummler and Ng, pp. 149-166. IGI Global (2010) (screenshots provided). Available at: Safari Books Online.*

(Continued)

*Primary Examiner* — Daniel Kinsaul
(74) *Attorney, Agent, or Firm* — McDermott Will & Emery LLP

(57) ABSTRACT

Methods, systems, and apparatuses, including computer programs encoded on computer-readable media, for receiving one or more keywords at a web application that are used to search for documents of a first type. The documents are accessible by a user via an account of the user based upon user permissions. Search results are provided based upon the keywords and include links to one or more documents of the first type. A selection one or more of the links is received. Selecting the links logs data that includes an indication that the documents were selected. A request for a list of most or recently selected documents of the first type for the user is received. The list of most or recently selected documents of the first type is based upon an aggregation of the logged data, and the list of most selected documents of the first type is provided.

20 Claims, 5 Drawing Sheets

(56) References Cited

OTHER PUBLICATIONS

"A New Approach to Printing," by Jazayeri, Mike. In: The Chromium Blog (Apr. 15, 2010). Available at: http://blog.chromium.org/2010/04/new-approach-to-printing.html.*

"Coming Soon in Google Docs—Third Party Apps Cloud Printing and Sync," by Chitu, Alex (Nov. 2, 2010). In: Googlesystem.blogspot.com. Available at: http://googlesystem.blogspot.com/2010/11/coming-soon-in-google-docs-third-party.html.*

"Chrome 8," by Google (screenshots from Google Chrome v. 8.0.552.224, released Dec. 2010).*

"Multiple Profiles—The Chromium Projects," by Chromium.org (wayback machine capture of Dec. 3, 2010). Available at: http://dev.chromium.org/user-experience/multi-profiles http://web.archive.org/web/20101203135417/http://dev.chromium.org/user-experience/multi-profiles.*

"New Tab—The King—for Firefox—The Blog," by newtabking.com (Internet Archive capture of Dec. 23, 2010). Available at: http://www.newtabking.com/blog/.*

"All Email Messages in Gmail Have a Permanent Web Address," by Agarwal, Amit (Jan. 28, 2009). Available at: http://www.labnol.org/internet/gmail-emails-have-permanent-web-address/6811/.*

"New Tab page—The Chromium Projects," by CHromium.org (wayback machine capture of Dec. 3, 2010). Available at: http://dev.chromium.org/user-experience/new-tab-page http://web.archive.org/web/20101203143745/http://dev.chromium.org/user-experience/new-tab-page.*

"How Google Chrome Stores Web History," by Sarah at lowmanio.co.uk (Jun. 10, 2010). Available at: lowmanio.co.uk/blog/entries/how-google-chrome-stores-web-history/.*

"Using the New Tab Page," Google Chrome Help, 2001 http://support.google.com/chrome/bin/answer.ph?hl=en&answer=95451.

"Opera Extensions API: Speed Dial Guide," opera.com Jun. 28, 2011, http://www.opera.com/docs/aps/extension/speeddialguide/.

"Increasing Your Browsing Speed," Getting Started with Opera, Opera Software ASA, 2011, http://www.opera.com/browser/tutorials/intro/speed/.

"Synchronize Your Mail Calendar and Contacts," Google Sync Services, 2011, http://www.google.com/sync/index.html.

* cited by examiner

LIST OF MOST SELECTED WEB BASED APPLICATION DOCUMENTS

BACKGROUND

Users search for, refer to, send, edit, etc., numerous emails and documents throughout a day. A particular document, email or email thread can be referred to numerous times. Some applications provide a user with a list of most recently accessed documents. Users can use this list to refer quickly to a document that was recently accessed. Such a list allows a user to refer to a recently accessed document without requiring the user to search for the document.

SUMMARY

In general, one aspect of the subject matter described in this specification can be embodied in methods for receiving one or more keywords at a web application. The one or more keywords are used to search for documents of a first type. The documents are accessible by a user via an account of the user based upon user permissions. Search results are provided based upon the received one or more keywords and include links to one or more documents of the first type. A selection one or more of the links to the one or more documents in the search results is received. Selecting the one or more of the links logs data. The logged data includes an indication that the one or more documents was selected. A request for a list of most or recently selected documents of the first type for the user is received. The list of most or recently selected documents of the first type is based upon an aggregation of the logged data, and the list of most selected documents of the first type is provided. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Users search for documents, e.g., emails, word processing documents, spreadsheets, images, etc., using various tools, such as a keyword search, various folders arranged by topic, manually scanning titles of documents, etc. Certain documents can be repeatedly searched for and accessed by a user. The number of times that a document is accessed by a user can be logged. From this logged data, a list of the most accessed documents can be generated and presented to a user. In addition, various other lists can be generated. For example, a list of most selected documents of a particular type can be generated. Other examples include a list of most printed, most searched, most shared, and/or most edited documents.

Figure 1:
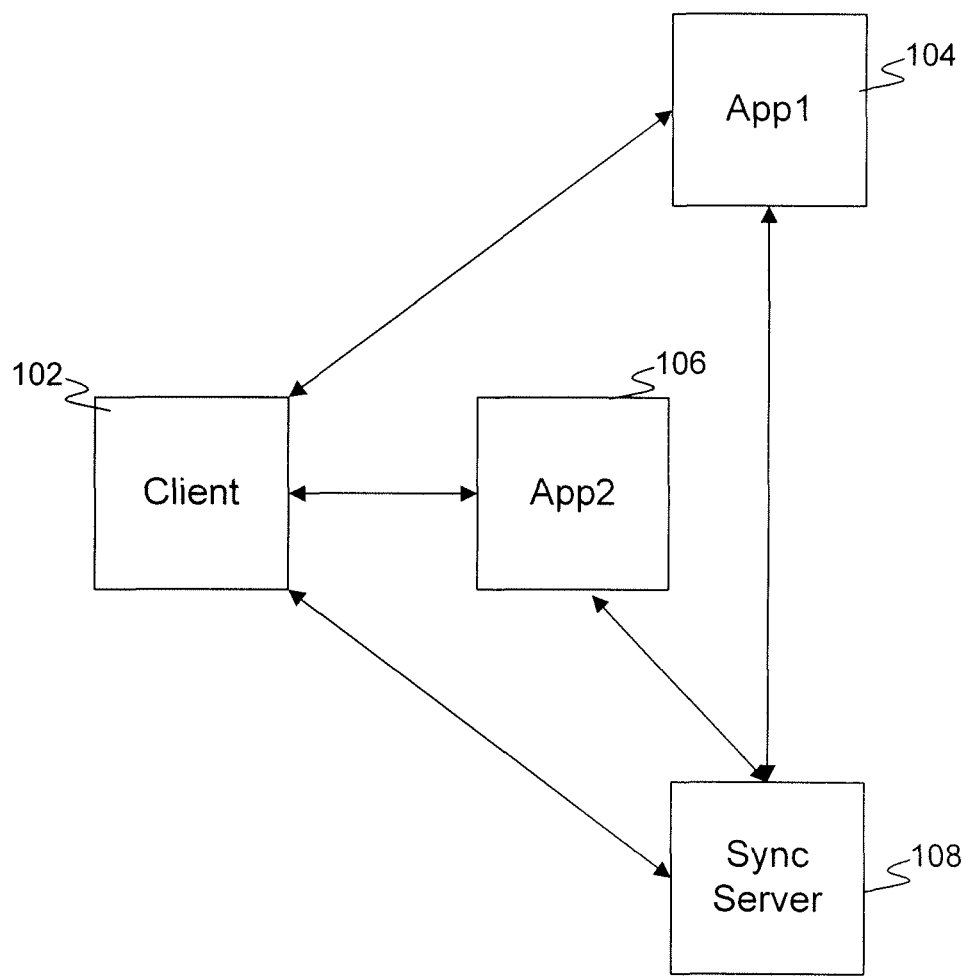
FIG. 1 illustrates a block diagram of an example of a system for generating lists of selected web-based application documents in accordance with an illustrative implementation.

FIG. 1 illustrates a block diagram of an example of a system for generating lists of selected web-based application documents in accordance with an illustrative implementation. A client 102, such as a computing device running a web browser, can access various online applications. An online or web application is an application that is configured to run on a server and be accessible over a network, such as the internet. For example, an email web application allows a user to access an email account over a network. In some implementations, a web application can store data remotely from a client device. In these implementations, a user can access the web application data from any number of clients. As another example, a web application 104 can be an online word processing program for editing word processing documents. Another web application 106 can allow the creating and editing of spreadsheets. Other web applications are also possible. For example, other web applications can include, but are not limited to, a mapping application, a presentation application, an email application, a drawing application, a form application, etc. Some applications allow editing/creating of specific types of documents. For example, applications can allow editing/creating of spreadsheets, text documents, drawings, etc.

The client 102 can access one or more online applications using a network, such as the internet. An application operating on a server computer, such as a web server, can provide a list of documents that can be edited by the client 102. For example, an application can list some or all of the documents of a particular type that a particular user has access to. In another example, a single interface can provide a list of documents of various types. In some implementations, a user must log into an application, after which a list of documents associated with the user can be displayed. In these implementations, the example, a user can have an account is associated with a username and password or other credentials. Using the username and credentials, a user can login into a web application. Data associated with the user, such as the username, credentials, permissions, document data, etc., can be stored in a user profile. Permissions associated with a user can be used to determine the documents that a user has access to. For example, a document can be created that is only accessible to a particular user. Documents can also be shared, such that a document can be accessed by one or more users. Public documents can also be created, which can be accessed by anyone. Permissions can be used to define the access level each user has. For example, one user may have the ability to view, edit, print, etc. a document, while another user may have the ability to view the document. Accordingly, a user will see only those documents that the user has access to when they log into a web application. The client 102 can send the application 104 a reference to a particular text document to begin editing of the text document. The client can also access one or more spreadsheets from the application 106.

The selection of a particular document can be logged. Logging can be done at various computing devices. For example, the applications 104 and 106 can log the selected document received from the client 102. In these implementations, data associated with a user can be logged across multiple clients by the applications. In another implementation, the client 102 can log the selection of documents locally. For example, a plugin to or an extension of a web browser or the browser itself can store data locally. In yet another implementation, the selection of documents can be sent to a synchronization server 108. For example, each selection of a document can send a request to the corresponding application and also an indication of the selected document to the synchronization server 108. In another implementation, the applications 104 and 106 can send the selection of documents to the synchronization server 108.

The indication can include information such as, but not limited to, a user identifier, a session identifier, a document identifier, a document name, a document type, a timestamp, an action identifier, etc. Logging of the selection of documents can be done in an unobtrusive way for the user. For example, as part of selecting and displaying a document, the selection can be logged without requiring further input from the user. Enabling of such logging can be configurable. For example, a user can enable/disable the logging of selections of documents through a user preferences interface.

Regardless of where the data is logged, the data can be aggregated (e.g., summed, grouped, etc.) at one or more of the various computing devices. The data can be aggregated to determine how many times each particular document was selected, how many times the document was selected over a period of time (e.g., in the last day, last week, last month, etc.), etc. In some implementations, the aggregation of the data can be done at the computing device that logs the data. In another implementation, the aggregated data can be sent to the synchronization server 108.

Once the data is aggregated, a user can request a list of the most selected documents. In one implementation, the user can request a list of the most selected documents for various document types. For example, a user can request a list of most selected word processing documents and a list of most selected spreadsheets. Once received, these lists can be displayed within a web browser. In one implementation, the lists can be displayed in a tab of a browser. For example, when the user opens a new web browser tab, the most selected word processing documents and the most selected spreadsheets can be displayed for the user. The displayed list can provide links to the various documents, which upon selecting, retrieve the selected document. In one implementation, the displayed list includes a visual preview of each document. For example, a cached version of the document or a newly accessed copy of the document can be displayed as a thumbnail of the document.

In addition to the most selected documents, various other lists of documents can be produced based upon the aggregated logged data. For example, each time a user prints a document an indication of the print action can be logged. Another example is editing and/or saving a document. Each time a document is edited or saved, an indication of this action can be logged. Other actions include, but are not limited to, sharing a document, forwarding a document, posting a link to a document to a social networking site, a document being returned in search results, etc. Once the logged data is aggregated, the user can request a list of most printed documents, most saved documents, most search documents, most shared documents, etc.

Figure 2:
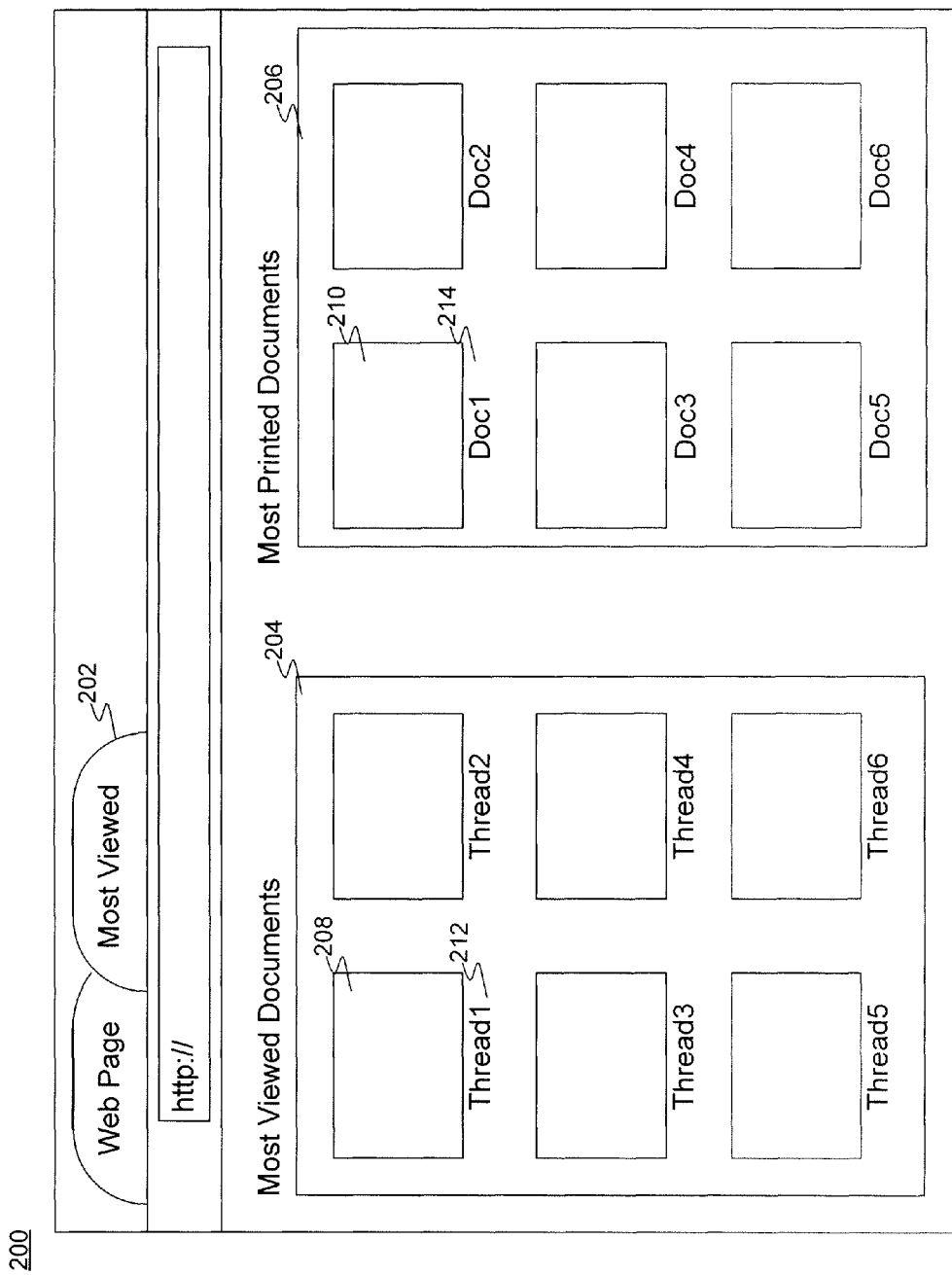
FIG. 2 illustrates an example of a most viewed tab in accordance with an illustrative implementation.

FIG. 2 illustrates an example of a most viewed tab in accordance with an illustrative implementation. A most viewed tab 202 of a browser interface 200 can provide one or more lists of documents. For example, a most viewed documents section 204 can provide a list of the most viewed documents. In one implementation, the section 204 can include the most selected documents of a particular type. The section 204 can include a list of the documents that includes the name of each document. In another implementation, a preview of each document can be shown. For example, a preview 208 can be shown of an email thread titled Thread1 212. The most viewed tab 202 can also include a second section 206 of documents. For example, the section 206 can include a list of the most printed documents. Similar to the first section 204, each document in the second section 206 can include a preview 210 as well as a name 214. The sections 204 and 206 can include other information, such as the name of each document, an email thread title, the number of times the document was selected/printed, the date of the last action, etc.

In one implementation, the list of documents can be restricted based upon a time period. For example, the most selected documents within the past day, week, work week, weekend, month, quarter, year, etc., can be requested. In this implementation, the logged data includes a timestamp indicating when a particular action took place. This timestamp can be used to determine the number of times a particular action took place in any given time period. For example, selecting a document numerous times six months ago would log data with an indication of the date and/or time each selection took place. Creating a list of the most selected documents within the past week would exclude the selection of these documents based upon the timestamp data.

Given the various lists that can be generated, a user can configure a most viewed tab to include one or more lists. These lists can be configured by the user. For example, a user can configure the number of lists displayed, a time span for each list, how to display each document in the list, the document type for each list, the type of list, the number of documents within a list, etc. For example, a user can choose the type of list based upon the various logged actions. A user can select to show the most selected, printed, edited, searched, forwarded, shared, etc. documents for a particular list. In addition, the user can select a time span for each list. As an example, a user can configure the most viewed tab to include three lists of documents. A first list can include the most viewed documents, regardless of type, over all of the logged data. In addition, the documents of the first list can be displayed in a list format limited to the top three documents that includes the title of each document at the bottom of the tab. A second list can be configured to display the top six word processing documents selected within the last week. In addition, a preview of each document can be displayed along with the document's title and the number of times the document was selected within the last week. The third list can be configured to display the six most searched-for emails over the last month. Each email can be displayed as a preview of the email along with the subject, who sent the email, who received the email, time sent, time received, etc.

In another implementation, documents searched for by a user can be logged and a list of documents included most often in search results can be generated. As a specific example, a user can search through emails using keywords. Search results, e.g., a list of emails, can be provided to the user based upon the keywords. Information identifying the emails returned to the user can be logged as being part of search results. In addition, the keywords can be logged. In one implementation, additional information is logged and used to weigh the various returned emails. For example, a selection of an email from search results can be logged. The logged data can include information identifying the selection of the email and an indication that the email was part of search results. In some implementations, positive user feedback impacts the scoring of emails within a list. For example, in one implementation, a list of the most selected emails can be generated.

Emails that were part of any search results can be included in this list; however, the ordering of the emails can depend upon whether the emails were selected. For example, an email being returned in a set of search results can be given a particular value. Selecting an email, however, can be given a larger value. The values across all searches/accesses can be summed to determine a score for each email. The emails can then be ranked based upon the score, and the top emails can be selected.

In some instances, a user may click on various emails looking for a particular email. The last selected email can be presumed to be the email that the user was searching for. Accordingly, in one implementation, the last selected email from a set of search results can be assigned a high value compared to previously selected emails. In yet another example, only the selected emails or last selected email are scored and any unselected emails are essentially ignored. That is, unselected emails in search results are not assigned any value solely for being included in search results.

In one implementation, once an email is selected or included in search results, an identifier associated with the email can be used to increment a count. For example, a message identifier unique to an email can be used to locate the count. In another implementation, a thread identifier associated with a thread to which the email belongs can be used to locate the count. In yet another implementation, both identifiers are used to store two different counts, one for the email and one for the thread to which the email belongs.

If the identifier does not exist in a data store, the identifier can be created and the count set to an initial value, such as 1. The data store can be part of the email application, stored locally at a client, or in a synchronization server. To allow for different lists for different users, a user identifier can also be logged along with the email identifier. For example, an email is selected and both an email identifier count is incremented and a thread identifier count is incremented. After searching and selecting various emails, the user can request a list of most selected emails or most selected email threads. The browser can request or read from the data store to determine the most selected emails/threads. Document types other than email can also be searched using keywords. Accordingly, the above example regarding email can be applied to word processing documents, spreadsheets, etc.

Figure 3:
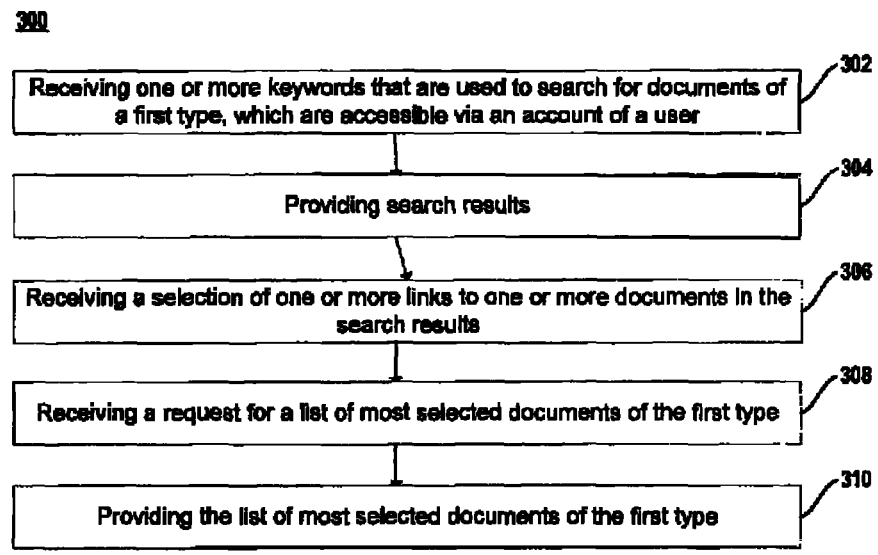
FIG. 3 is a flow diagram of a process for generating a list of most selected web documents in accordance with an illustrative implementation.

FIG. 3 is a flow diagram of a process for generating a list of most selected web documents in accordance with an illustrative implementation. The process 300 can be implemented on a computing device. In one implementation, the process 300 is encoded on a computer-readable medium that contains instructions that, when executed by a computing device, cause the computing device to perform operations of process 300.

A client, such as a web browser, can receive one or more keywords from a user. These keywords can be sent to a web application (302). The web application can allow access to documents of one or more types. For example, a web application can allow users to edit word processing documents and spreadsheets, which may be stored on a web server computer. The keywords can be used to search for documents of a particular type that are accessible to a user via a user account. Documents can be accessed by the user based upon user permissions. For example, the user can access documents that they have previously created or a document that has been shared by a different user with the user. One user can grant permission to view, edit, share, delete, etc., or more than one of these permissions to another user on a document-by-document basis. Search results are provided based upon the one or more keywords (304). For example, the search results can be provided to the client. The search results include links to one or more documents of the one or more types. For example, the search results can include links to emails, spreadsheets, word processing documents, etc.

The user can select one or more of the documents within the search results. The web application can receive the selection of one or more links to the selected documents (306). In one implementation, the web application can log that these documents were selected by the user. The logged data can include a user identifier, a document identifier, and a timestamp. In other implementations, the client or another server, such as a synchronization server, can log the selected documents. The logged data can be aggregated together and this aggregated data can be used to generate a list of the most selected documents. A request for a list of most selected documents of a particular type for the user can be received (308). For example, the web application can receive this request from the client. The list can be based upon all of the aggregated data associated with the user or can be limited to a time period. For example, a user can request the most selected documents within the last day, week, month, etc. The list can be provided to the client (310). The client can display the list, for example, in a new tab of a browser.

Figure 4:
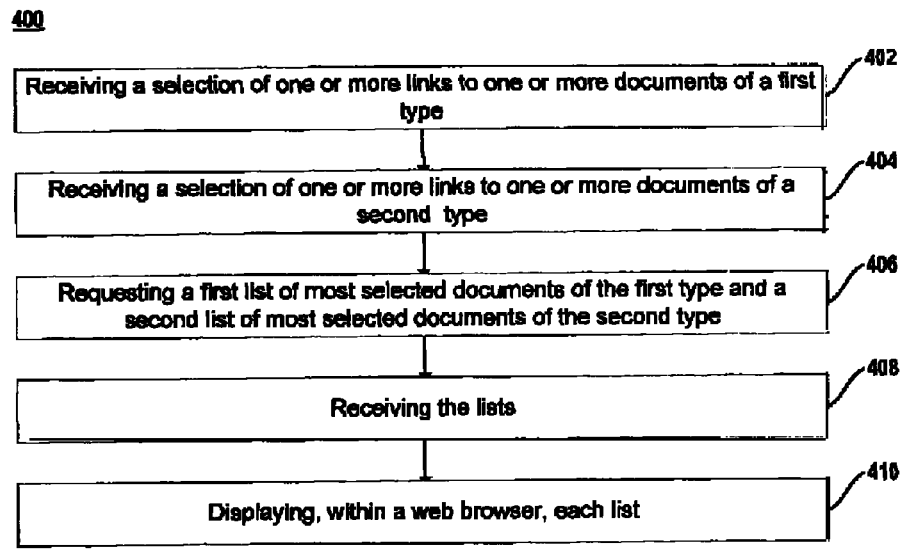
FIG. 4 is a flow diagram of a process for generating lists of selected web based application documents in accordance with an illustrative implementation.

FIG. 4 is a flow diagram of a process for generating lists of the selected web-based application documents in accordance with an illustrative implementation. The process 400 can be implemented on a computing device. In one implementation, the process 400 is encoded on a computer-readable medium that contains instructions that, when executed by a computing device, cause the computing device to perform operations of process 400.

A selection of one or more links to one or more documents of a first type is received (402). For example, a user can select a word processing document and edit the word processing document using a web application. The user can also select another word processing document and print that document. Each selection of the documents can be logged. The logged data can include of the user who selected the documents and identifying information regarding which documents were selected. Other data can also be logged, such as, but not limited to, a session identifier, a document identifier, a document name, a document type, a timestamp, an action identifier, etc.

A selection of one or more links to one or more documents of a second type is received (404). For example, a user can select a spreadsheet for viewing using a web application. The user can also select another spreadsheet and share the spreadsheet with another user. Each selection of the documents can be logged. The logged data can include the user who selected the documents and identifying information regarding which documents were selected. Other data can also be logged, such as, but not limited to, a session identifier, a document identifier, a document name, a document type, a timestamp, an action identifier, etc.

The user can request a list of most selected documents based upon an aggregation of the logged data. For example, the user can request a list of most selected documents of the first type and a list of most selected documents of the second type (406). In other implementations, the user can request a single list, such as the most selected emails. In addition to the most selected documents, the user can request various other lists. For example, the list can include, but is not limited to, the most shared, the most printed, the most edited, etc. After requesting the lists, the lists are received (408). Each list can include a list of documents. The list can include information identifying the document and a link to the where the document can be accessed. The lists can be displayed within a browser (410). For example, the lists can be displayed in a tab of the web browser. As another example, the top five, six, ten, etc. documents from each list of documents can be displayed as links in a tab of a web browser. A user can click on any document link to access the document. In another embodiment, a thumbnail of each document can be displayed and linked to the document.

Figure 5:
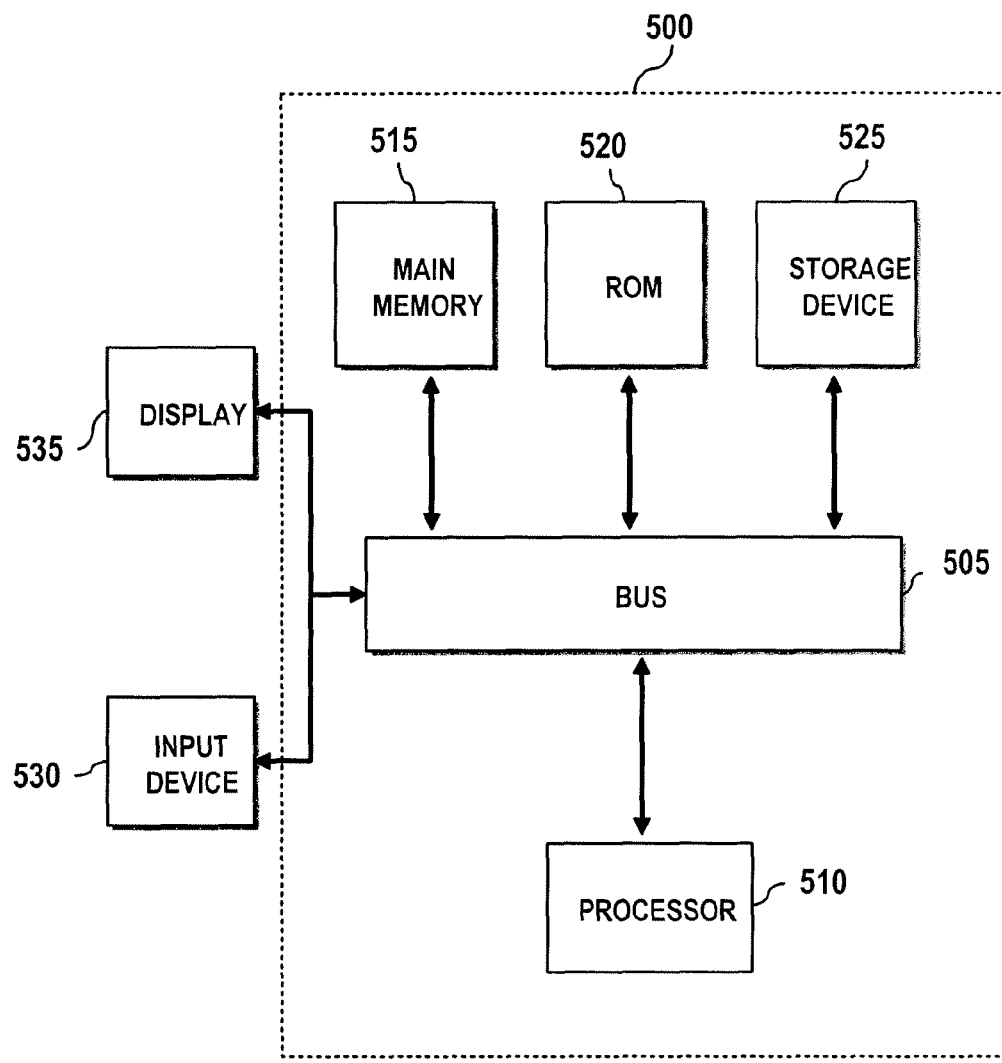
FIG. 5 is a block diagram of a computer system in accordance with an illustrative implementation.

FIG. 5 is a block diagram of a computer system in accordance with an illustrative implementation. The computer system or computing device 500 can be used to implement a client, web application server, web server, synchronization server, etc. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs embodied on a tangible medium, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for presenting a list of most or recently selected documents in a new tab of a web browser comprising:
   accessing, by the web browser, a first online document having a first document type, stored on a first web server using a first web application running on the first web server;
   storing, by the web browser and in response to the first document being accessed by the web browser, an identifier for the first document and a user identifier in a local data store;
   incrementing, by the web browser and in response to the first document being accessed by the web browser, a count value in the local data store associated with the identifier for the first document;
   accessing, by the web browser, a second online document having a second document type, stored on a second web server using a second web application running on the second web server;
   storing, by the web browser and in response to the second document being accessed by the web browser, the user identifier and an identifier for the second document in the local data store;
   incrementing, by the web browser and in response to the second document being accessed by the web browser, a count value in the local data store associated with the identifier for the second document;
   aggregating, by the web browser, data in the local data using the user identifier and the count values associated with the first and second document identifiers in the local data store;
   presenting at least one list of most or recently selected documents categorized by the first document type or the second document type in the new browser tab using the aggregated data from the local data store and in response to receiving a request for the new browser tab;
   receiving at least one configuration applicable to the presenting of the at least one list from a user, where the at least one configuration comprises one or more of a number of lists displayed, a time span for each list displayed, the document type for each list, or the number of documents within a list; and
   sending the user identifier and the aggregated data to a synchronization server associated with the web browser.

2. The method of claim 1, wherein the web browser comprises a plugin or extension configured to detect that the first document is being accessed by the web browser and to store the identifier for the first document and the user identifier in the local data store.

3. The method of claim 2, wherein the web browser is further configured to store versions of the first and second documents in a local cache, wherein the list of most or recently selected documents presented in the new browser tab comprises visual previews of the first and second documents using the versions of the first and second documents stored in the local cache.

4. The method of claim 1, wherein the first web application is configured to print the first online document.

5. The method of claim 1, wherein the first web application comprises an online word processing program.

6. The method of claim 1, wherein the second web application comprises an online email program.

7. The method of claim 6, wherein the list of most or recently selected documents comprises most or recently selected email threads accessed via the online email program, and the method further comprises:
- storing, by the web browser and in response to an email thread being accessed by the web browser, a thread identifier associated with the email thread;
- incrementing, by the web browser and in response to the email thread being accessed by the web browser, a thread count value in the local data store associated with the thread identifier; and
- aggregating, by the web browser, data in the local data store using the user identifier and the thread count value associated with the thread identifier.

8. A system comprising one or more processors configured to execute a web browser, the web browser being configured to:
- detect an indication to print a first online document stored on a first web server using a first web application running on the first web server;
- store, in response to the detection of the indication to print the first document, an identifier for the first document and a user identifier in a local data store;
- increment, in response to the detection of the indication to print the first document, a count value in the local data store associated with the identifier for the first document;
- detect an indication to print a second online document stored on a second web server using a second web application running on the second web server;
- store, in response to the detection of the indication to print the second document, the user identifier and an identifier for the second document in the local data store;
- increment, in response to the detection of the indication to print the second document, a count value in the local data store associated with the identifier for the second document;
- aggregate data in the local data store using the user identifier and the count values associated with the first and second document identifiers in the local data store;
- present a list of most or recently printed documents in a new browser tab using the aggregated data from the local data store and in response to receiving a request for the new browser tab; and
- send the user identifier and the aggregated data to a synchronization server associated with the web browser.

9. The system of claim 8, wherein the web browser comprises a plugin or extension configured to detect that the first document is printed and to store the identifier for the first document and the user identifier in the local data store.

10. The system of claim 9, wherein the web browser is further configured to store versions of the first and second documents in a local cache, wherein the list of most or recently printed documents presented in the new browser tab comprises visual previews of the first and second documents using the versions of the first and second documents stored in the local cache.

11. The system of claim 8, wherein the first web application is configured to print the first online document.

12. The system of claim 8, wherein the first web application comprises an online word processing program.

13. The system of claim 8, wherein the second web application comprises an online email program.

14. The system of claim 13, wherein the list of most or recently printed documents comprises most or recently selected email threads accessed via the online email program, and the method further comprises:
- storing, by the web browser and in response to an email thread being printed by the web browser, a thread identifier associated with the email thread;
- incrementing, by the web browser and in response to detection of the indication to print the email thread, a thread count value in the local data store associated with the thread identifier; and
- aggregating, by the web browser, data in the local data store using the user identifier and the thread count value associated with the thread identifier.

15. A computer-readable storage medium having instructions therein that cause one or more processors to perform operations comprising:
- detecting, by the web browser, a search for a first online document stored on a first web server using a first web application running on the first web server;
- storing, by the web browser and in response to the detection of the search for the first document, an identifier for the first document and a user identifier in a local data store;
- incrementing, by the web browser and in response to the first document, a count value in the local data store associated with the identifier for the first document;
- detecting, by the web browser, a search for a second online document stored on a second web server using a second web application running on the second web server;
- storing, by the web browser and in response to the detection of the search for the second document, the user identifier and an identifier for the second document in the local data store;
- incrementing, by the web browser and in response to the detection of the search for the second document, a count value in the local data store associated with the identifier for the second document;
- aggregating, by the web browser, data in the local data store using the user identifier and the count values associated with the first and second document identifiers in the local data store;
- presenting a list of most or recently searched for documents in the new browser tab using the aggregated data from the local data store and in response to receiving a request for the new browser tab; and
- sending the user identifier and the aggregated data to a synchronization server associated with the web browser.

16. The computer-readable storage medium of claim 15, wherein the web browser comprises a plugin or extension configured to detect that the first document is searched for and to store the identifier for the first document and the user identifier in the local data store.

17. The computer-readable storage medium of claim 16, wherein the web browser is further configured to store versions of the first and second documents in a local cache, wherein the list of most or recently searched for documents presented in the new browser tab comprises visual previews of the first and second documents using the versions of the first and second documents stored in the local cache.

18. The computer-readable storage medium of claim 15, wherein the first web application is configured to print the first online document.

19. The computer-readable storage medium of claim 15, wherein the first web application comprises an online word processing program.

20. The computer-readable storage medium of claim 15, wherein the second web application comprises an online email program.

* * * * *